Feb. 25, 1947.  E. H. YONKERS  2,416,560
ALTERNATING CURRENT GENERATOR
Filed Dec. 13, 1943  2 Sheets-Sheet 1

INVENTOR.
EDWARD H. YONKERS
BY
*Foorman L. Mueller*
ATTORNEY

Feb. 25, 1947.  E. H. YONKERS  2,416,560
ALTERNATING CURRENT GENERATOR
Filed Dec. 13, 1943  2 Sheets-Sheet 2
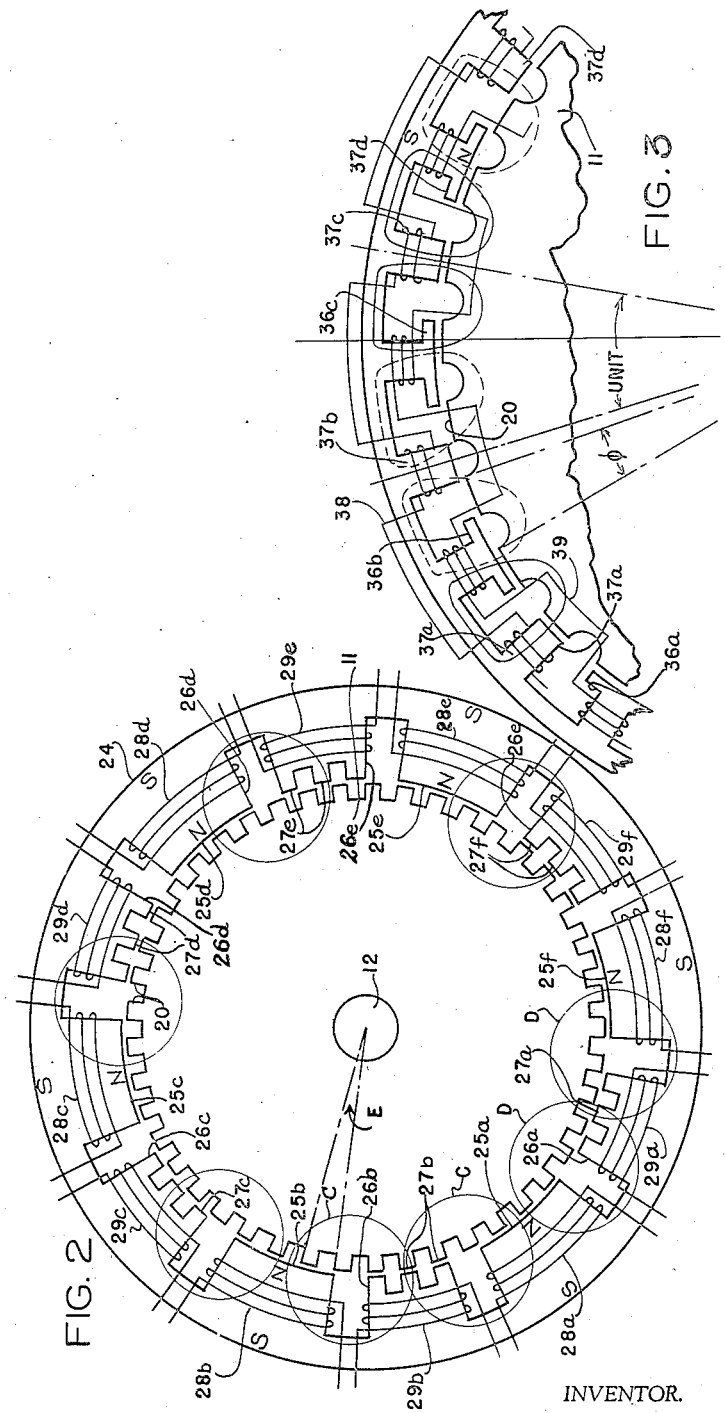
INVENTOR.
EDWARD H. YONKERS
BY Foorman L. Mueller
ATTORNEY Patented Feb. 25, 1947

2,416,560

UNITED STATES PATENT OFFICE 2,416,560

ALTERNATING CURRENT GENERATOR

Edward H. Yonkers, Chicago, Ill.

Application December 13, 1943, Serial No. 514,029

3 Claims. (Cl. 171—252)

The present invention relates to alternating current generators and more particularly to improvements in electro-mechanical generators of the inductor type.

It is an object of the present invention to provide an improved electro-mechanical generator which is light in weight, efficient in operation, simple and rugged in arrangement, compact in construction, and utilizes no rotor windings in the generation of its electrical output.

It is another object of the invention to provide an improved mechanical generator of the character described which is capable of producing a high frequency alternating current when operated at relatively low rotor speeds.

According to another object of the invention, the generator rotor speed required to produce a given frequency output with a generator of given size and weight is minimized by providing improved facilities for alternately directing the field flux through different sections of the generator field structure.

In accordance with still another and more specific object of the invention, a high output frequency is obtained with a small rotor by providing a rotor having teeth which are alternately brought into registry with the teeth carried by two different pole pieces of the field structure, whereby the predominant portion of the flux traversing the field structure is alternately shifted from one pole piece to the other each time the rotor periphery is advanced a distance equal to the width of one of the rotor teeth.

It is another object of the invention to utilize to the maximum the available peripheral surface of the rotor in directing the field flux through each pole piece, thereby to obtain the maximum electrical output for a generator of given size having a given number of turns in its output windings.

It is a further object of the invention to provide an improved generator of the character described which employs a magnetic field path of substantially constant reluctance, whereby hysteresis losses in the field structure and distortion of the output voltage from a desired wave form are minimized.

It is still another object of the invention to provide a multi-phase generator which is characterized by all of the structural and operating features referred to above.

It is still a further object of the invention to provide an improved generator of either the single or multi-phase type, which is characterized by the above-mentioned structural features, and yet may be designed on the basis of a wide variety of rotor speeds, to produce alternating current of any desired frequency.

The invention, both as to its organization and method of operating, together with further objects and advantages thereof, will best be understood by reference to the following specification taken in connection with the accompanying drawing, in which:

Fig. 2 illustrates a modified embodiment of the invention; and

Fig. 3 is a fragmentary side view of a single phase low output frequency generator characterized by the features of the present invention.

Figure 1:
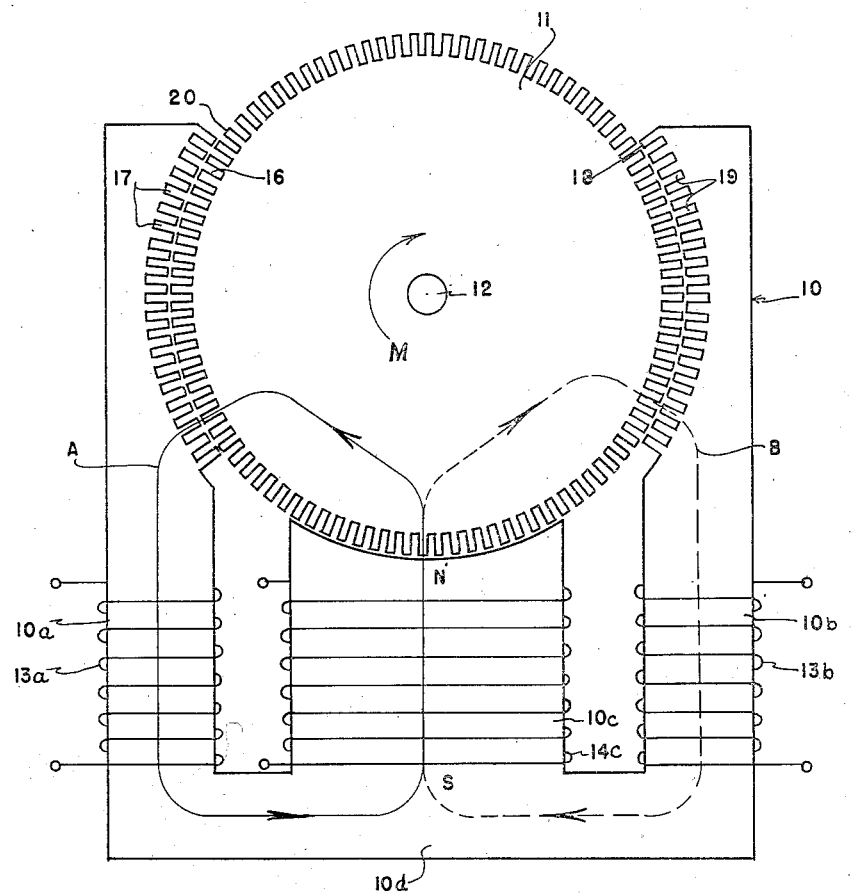
Fig. 1 illustrates in partially schematic form an improved alternating current generator characterized by the features of the invention briefly referred to above.

Referring now to the drawings, and more particularly to Fig. 1 thereof, the improved alternating current generator there illustrated comprises a magnetic field structure 10 which is made up of a plurality of E-shaped laminations of soft iron or another suitable magnetic material. These laminations are punched, stacked to the proper depth and clamped together to provide a rigid assembly in any conventional manner. The two outer legs 10a and 10b of the field structure 10 are respectively provided with opposed pole faces 16 and 18 which define different arcs of the same circle. A rotor 11, also formed of stacked laminations of soft iron or another suitable magnetic material, is mounted upon a drive shaft 12 for rotation relative to the pole faces 16 and 18, the axis of rotation of this rotor being substantially coincident with the common centers of the two pole face arcs 16 and 18. For the purpose of causing flux to traverse the field structure 10 and the rotor 11, the center leg 10c of this structure is utilized as an electromagnet, a winding 14 being provided thereon which is adapted for energization from any available source of direct current of appropriate voltage.

In order to direct the flux produced by the magnetized leg 10c alternately through the two legs 10a and 10b of the field structure over flux paths which commonly include the rotor 11, this rotor is provided around its periphery with teeth 20 which are arranged alternately to be moved into registry with teeth 17 provided in the pole face 16 and teeth 19 provided in the opposing pole face 18. More specifically, the rotor teeth 20 are of a uniform width which exactly equals the width of the slot separating each adjacent pair of these teeth. The teeth 17 and 19, as well as the slots separating these teeth, are of the same width, the arrangement being such that when the teeth 20 around one peripheral sector of the rotor 11 are in exact registry with the teeth 17 of the pole face 16, for example, the rotor teeth occupying the opposing peripheral sector of the rotor are in exact registry with the slots separating the teeth 19 provided in the pole face 18. The two outer legs 10a and 10b of the field structure respectively carry windings or inductor coils 13a and 13b, one or both of which may be suitably connected to the generator load circuit.

In considering the operation of the generator, it may be assumed that the shaft 12 and the rotor 11 are being rotated by a suitable driving motor in a clockwise direction as viewed in the drawing. As indicated above, each time the rotor 11 is moved to an angular position such that certain of its teeth 20 are in exact registry with the teeth 17 of the pole face 16, the opposing rotor teeth are in alignment with the slots separating the teeth 19 of the pole face 18. Accordingly, the reluctance of the air gap separating the rotor periphery from the pole face 16 is substantially less than the reluctance of the air gap separating the rotor 11 from the pole face 18. As a result, the predominant portion of the flux produced by magnetization of the field structure leg 10c is caused to traverse the substantially closed flux path A which includes the registering teeth 20 and 17, and the leg 13a of the field structure. During continued movement of the rotor 11 and as the teeth 20 are moved out of registry with the teeth 17, the opposing rotor teeth 20 are moved into registry with the teeth 19 of the opposing pole face 18. During such continued movement of the rotor the reluctance of the air gap separating the rotor from the pole face 16 increases, concurrently with a corresponding decrease in the reluctance of the air gap separating the rotor from the pole face 18. Accordingly, the flux traversing the leg 10a is caused to decrease concurrently with a corresponding increase in the flux traversing the leg 10b until a point is reached at which the predominant portion of the flux traverses a second substantially closed flux path B which includes the rotor 11, the registering teeth 20 and 19, and the field structure leg 10b.

It will thus be apparent that as the rotor 11 is driven at a high speed, the flux produced by magnetization of the center leg 10c is shifted from one of the two outer legs 10a and 10b to the other each time a point on the periphery of the rotor is rotated through an arc which equals the width of one rotor tooth. In other words, if the rotor is provided with N teeth, substantially all of the flux traversing the magnetized leg 10c of the field structure will be shifted between the two outer legs 10a and 10b N times during each revolution of the rotor 11. As the flux traversing the leg 10a of the field structure is alternately increased and decreased in the manner just explained, an induced voltage is of course developed in the winding or inductor coil 13a. Similarly, the changing flux through the leg 10b of the field structure causes an induced voltage to be developed in the inductor coil or winding 13b. Assuming that the two coils 13a and 13b have the same number of turns and uniform impedance characteristics and that the reluctances of the two flux paths through the legs 10a and 10b of the field structure are uniformly changed in inverse and alternate senses, the voltages developed across the terminals of the two windings 13a and 13b are of equal magnitude. By suitably interconnecting the two windings, the voltages thereacross may be additively combined to provide a total voltage having twice the magnitude of that across either coil considered alone. It will be understood, moreover, that the flux traversing each leg 10a and 10b of the field structure is increased from a minimum to a maximum and then decreased from the maximum value to the minimum value each time a point on the rotor periphery is rotated through an arc equaling the combined width of one rotor tooth and one rotor slot. Accordingly, a complete cycle of the alternating voltage induced in each of the windings 13a and 13b occurs each time the rotor 11 is rotated through an angle defining the arc span of one rotor tooth and the adjacent rotor slot. Thus the frequency of the voltage produced by the generator is equal to a multiple of the rotor speed and the number of rotor teeth. For example, if the rotor is provided with 300 teeth and is rotated at a speed of 3600 revolutions per minute, the generated voltage will have a frequency of 18,000 cycles per second.

The wave form of the output voltage as developed across the terminals of the two windings 13a and 13b is of course determined by the configuration of the teeth 17, 19 and 20 and the configuration of the slots provided therebetween. By utilizing tooth and slot configurations of correct design, a voltage of true sinusoidal wave form may be produced across the terminals of each of the two enumerated windings. In this regard it will be noted that since the pole face of the field structure center leg 10c is unslotted and is of the correct width to span a like number of rotor teeth and slots, i. e. seventeen of each in the illustrated arrangement, the reluctance of the air gap separating this pole face and the rotor 11 remains constant as the rotor teeth are moved past the unslotted pole face. Accordingly, the total flux traversing the center leg 10c of the field structure remains substantially constant. Thus each increase in the reluctance of the air gap separating the rotor 11 from the pole face 16 is accompanied by a corresponding decrease in the reluctance of the air gap separating this rotor from the pole face 18. Conversely, each increase in the reluctance of the air gap between the rotor 11 and the pole face 18 is accompanied by a corresponding decrease in the reluctance of the air gap between the rotor 11 and the pole face 16. Accordingly, the effective reluctance of the two parallel flux paths shunting the center leg 10c of the field structure remains constant for all angular positions of the rotor. With this arrangement, hysteresis losses and distortion of the output voltage wave form are minimized.

From the above explanation it will be understood that the pole faces 16 and 18, and the unslotted pole face of the center leg 10c should each span as large a sector of the rotor periphery as may be possible without unduly increasing the leakage flux between the center and two outer legs of the field structure. Thus, by increasing the three pole face arcs to the permissible maximum, the reluctances of their respective associated air gaps are correspondingly decreased, with a consequent increase in the rate of change of the flux density in the two outer legs 10a and 10b during movement of the rotor alternately to shift the flux from one outer leg to the other, and hence an increase in the obtainable output voltage with a generator structure of given size. It will also be understood that instead of magnetizing the center leg 10c of the field structure from an appropriate source of direct current, this leg may be in the form of a permanent magnet. Thus, a bar magnet formed of Alnico or the like may be suitably assembled midway between the legs of a U-shaped field structure so that the over-all configuration of the structure is exactly the same as shown in the drawings. If a permanent bar magnet is used, the device will of course be entirely self-contained, with a consequent increase in adaptability for use in field signaling operations where a source of high frequency voltage is required.

In the modified embodiment of the invention shown in Fig. 2 of the drawings, the arrangement is such that the entire peripheral surface of the rotor 11 may at all times be utilized in the generation of the desired output voltage. To this end, an annular stator 24 is provided which is made up of a plurality of stacked laminations of soft iron or like magnetic material, and includes a plurality of alternately disposed field poles 25 and inductor poles 26. In the illustrated arrangement, six field poles 25a, 25b, 25c, 25d, 25e and 25f equiangularly spaced around the inner periphery of the stator 24 are provided. Each of the six enumerated field poles carries a field winding 28 and includes a pole face which spans an equal number of rotor teeth 20 and intervening slots. Thus the field pole 25a, for example, is shown as spanning an arc around the circumference of the rotor 11 which embraces three rotor teeth 20 and three rotor slots. By virtue of this arrangement, the flux leaving the pole face of each field pole remains substantially constant regardless of the angular position of the rotor 11. The six inductor poles 26a, 26b, 26c, 26d, 26e and 26f are disposed between the field poles 25 in staggered relationship and each thereof is provided with a plurality of teeth 27. Each inductor pole carries an inductor winding 29 in which an induced voltage is developed in response to a change in the flux traversing the associated pole. These poles are provided with teeth 27 which are disposed adjacent the rotor teeth and are of the same arcuate width, the teeth of alternate inductor poles being offset by a distance of one tooth tip in order to permit the flux shifting operation in the manner more fully pointed out below. Thus, the inductor pole 26a is illustrated as being provided with three teeth 27a which are in registry with the slots of the rotor 11 when the teeth 27b and 27f of the two adjacent inductor poles are in exact registry with the teeth of the rotor 11. More generally considered, the teeth 27a, 27c and 27e are arranged to be in registry with rotor slots when the teeth 27b, 27d and 27f of the associated inductor poles are in exact registry with certain of the rotor teeth 20.

In utilizing the above-described arrangement, the inductor windings 29 may be connected in series aiding relationship or may be utilized individually or in various combinations as desired. The field coils 28 are preferably connected in series across a suitable source of direct voltage. When these coils are energized, a flux is produced in the magnetic structure comprising the rotor and stator laminations, which flux is alternately shifted from alternate ones of the inductor poles to the intermediate inductor poles to produce induced alternating voltages in the inductor coils 29. Thus, each time the rotor 11 is moved to an angular position such that certain of its teeth 20 are in exact registry with the teeth 27b of the inductor pole 26b, the teeth 27a and 27c of the adjacent inductor poles 26a and 26c, respectively, are in exact registry with certain of the rotor slots. Accordingly, the reluctance of the air gap separating the rotor periphery from the inductor pole 26b is substantially less than the reluctance of the air gaps respectively separating the rotor 11 from the inductor poles 26a and 26c. As a result, the predominant portion of the flux produced by magnetization of the two field poles 25a and 25b disposed on either side of the inductor pole 27b is caused to traverse the flux paths C which individually include the field poles 25a and 25b and commonly include the inductor pole 26b. During continued movement of the rotor 11 and as the teeth 20 are moved out of registry with the teeth 27b, others of the rotor teeth 20 are moved into registry with the teeth 27a and 27c. During such continued movement of the rotor, the reluctance of the air gap separating the rotor from the inductor pole 26b increases, concurrently with a corresponding decrease in the reluctance of each of the air gaps separating the rotor from the inductor poles 27a and 27c. Accordingly, the flux traversing the inductor pole 26b is caused to decrease concurrently with a corresponding increase in the flux traversing each of the two inductor poles 26a and 26c, until a point is reached at which the predominant portion of the flux traversing the field pole 25a is shifted from the inductor pole 26b to the inductor pole 26a, i. e., follows the dash line flux path D, and the predominant portion of the flux produced by the field pole B is shifted from the inductor pole 26b to the inductor pole 26c. In a similar manner and entirely concurrently with the flux shifting operation just described with reference to the field poles 25a and 25b, the flux produced by the other four field poles is, in each case, shifted from one adjacent inductor pole to the inductor pole disposed upon the opposite side thereof. It will thus be apparent that as the rotor 11 is driven at high speed, the flux produced by each field pole is alternately shifted from one adjacent inductor pole to the other at a rate which is determined by the number of teeth carried by the rotor 11 and the speed of rotation of the rotor. It will also be noted that all of the flux traversing each field pole 25 is shifted to cut all of the turns of the two inductor coils 29 at opposite sides thereof, each time the rotor is rotated through an angle defining one rotor tooth 20, i. e., half of the angle E.

In order to adapt the above-described principle of offsetting the inductor poles to the generation of low frequency alternating current, the arrangement illustrated in Fig. 3 of the drawings may be employed. Essentially, the structure there disclosed is the same as that described above with reference to Fig. 2 of the drawings, except that the number of rotor teeth 20 provided in the periphery of the rotor 11 is considerably reduced in order to provide for the desired lower output frequency, and the arrangement of the inductor poles 36 and field poles 37 around the inner periphery of the stator 35 has been correspondingly modified to accommodate the reduction in the number of rotor teeth. In this regard it is reiterated that the output frequency of the generator for a given rotor speed is determined entirely by the number of teeth provided in the periphery of the rotor. In the Fig. 3 arrangement, the pole face of each field pole 36 is of the correct width to span the arc defined by one large tooth and tooth slot at the periphery of the rotor 11, the width of the face of each inductor pole spans an arc equal to the width of a rotor tooth or slot and each inductor pole is displaced from each adjacent field pole by an arc equal to the width of one rotor tooth or slot. The field winding 38 comprises series connected field coils which surround the respective field poles 36 and are so arranged that the pole face of each field pole has the same magnetic polarity. The inductor winding, on the other hand, comprises coils individual to the inductor poles 37, which are alternately connected in reverse polarity so that the induced voltages produced therein are in phase with each other. In this regard it will be noted that, due to the angular displacement of one rotor tooth or slot as between alternate ones of the inductor poles 37, the increase and decay of flux through the pole 37b, for example, is during rotation of the rotor 11, displaced 180 degrees in phase from the corresponding flux cycle change through each of the adjacent inductor poles 37a and 37c. Accordingly, by providing reversely wound but series connected coils upon alternate ones of the inductor poles 37, the induced voltages developed therein are brought into phase so that the total generated voltage is equal to the algebraic sum of the induced voltages.

Aside from the differences just pointed out, the mode of operation of the structure shown in Fig. 3 is exactly the same as described above with reference to the generator shown in Fig. 2 of the drawings. From this description it will be understood that by suitably offsetting the inductor poles 37 relative to each other to provide an additional phase displacement between the induced voltages developed in the inductor coils carried thereby and by providing appropriate connections between the inductor coils, a multiphase voltage output may be obtained. Thus, if a three phase output is desired, each one-third of the inductor poles may be offset by an angle equal to one-third of the angle E relative to the remaining two-thirds of the inductor poles, in the same manner as was described above with reference to the arrangement shown in Fig. 3 of the drawings.

From the above explanation it will be apparent that in each of the structures shown in Figs. 2 and 3 of the drawings, the paths traversed by the flux generated by each field pole are extremely short and hence are of low reluctance, thus enhancing the efficiency of the generator. Further, substantially all of the iron in the rotor and stator structures is usefully employed so that the amount of iron required to produce a given volt-ampere output is reduced to a minimum. In this connection it may be pointed out that only the outer peripheral portion of the rotor 11 need be made up of iron laminations since the flux will not penetrate the rotor to any substantial depth. Accordingly, an annular rotor structure may be used which is spoke supported upon the rotor shaft. The desired voltage wave form can, of course, be obtained by appropriate design of the inductor pole and rotor teeth. Further, there are no limitations upon the speed at which the generator may be designed to operate to produce a given output frequency. Thus, this frequency is determined solely by the number of teeth provided in the periphery of the rotor 11 and has no relationship whatever to the number of field poles or inductor poles which may be provided. Accordingly, if it is desired to produce a generator which will supply a predetermined frequency output when operated at a given speed, it is only necessary to calculate the number of rotor teeth required. From this calculation and the known desired load rating, the size of the rotor teeth and hence the size of the rotor as a whole, together with the size of the stator, may readily be determined.

While different embodiments of the invention have been disclosed, it will be understood that various modifications may be made therein, which are within the true spirit and scope of the invention as defined in the appended claims.

I claim:

1. An alternating current generator comprising a stator provided with a pair of inductor poles each having a plurality of teeth and with a field pole disposed between said inductor poles, a rotor provided with a toothed periphery rotatable relative to said toothed inductor poles, the teeth of said inductor poles being so staggered relative to each other that the teeth of said rotor are alternately brought into registry with the teeth of one inductor pole and then the teeth of the other inductor pole, whereby substantially all of the flux produced by said field pole is alternately shifted back and forth between said inductor poles, said field pole being provided with an unslotted pole face spanning an equal number of the tooth tips and slots of said rotor, whereby the reluctance of the magnetic circuit extending through said rotor and inductor poles between the magnetic poles of said field pole remains constant regardless of the relative angular positions of said rotor and stator, and inductor pickup means embracing a part of said stator to be excited by the variations in the flux traversal of at least one of said inductor poles resulting from rotation of said rotor.

2. An alternating current generator comprising a substantially U-shaped stator provided with toothed leg extremities, a rotor disposed between said leg extremities and provided with a toothed periphery rotatable relative to said toothed leg extremities, magnet means disposed between the legs of said stator and said rotor, the teeth of said leg extremities being so staggered relative to each other that the teeth of said rotor are alternately brought into registry with the teeth of one leg extremity and then the teeth of the other leg extremity, whereby substantially all of the flux produced by said magnet means is alternately shifted back and forth between the legs of said stator during rotation of said rotor, and inductor pickup means embracing a part of said stator to be excited by the variations in the flux traversal of at least one of the legs of said stator resulting from rotation of said rotor.

3. An alternating current generator comprising a substantially U-shaped stator provided with toothed leg extremities which face each other, a rotor disposed between said leg extremities and provided with a toothed periphery rotatable relative to said toothed leg extremities, magnet means disposed between the legs of said stator and extending between the base of said stator and said rotor, the teeth of said leg extremities being so staggered relative to each other that the teeth of said rotor are alternately brought into registry with the teeth of one leg extremity and then the teeth of the other leg extremity, whereby substantially all of the flux produced by said magnet means is alternately shifted back and forth between the legs of said stator during rotation of said rotor, said magnet means being provided with an unslotted pole face spanning an equal number of rotor tooth tips and slots, whereby the reluctance of the magnetic circuit extending between the poles of said magnet means remains constant regardless of the relative angular positions of said rotor and stator, and inductor pickup means embracing a part of said stator to be excited by the variations in the flux traversal of at least one of the legs of said stator resulting from rotation of said rotor.

EDWARD H. YONKERS.

REFERENCES CITED

The following references are of record in the file of this patent:

UNITED STATES PATENTS

| Number | Name | Date |
|---|---|---|
| 1,160,087 | Neuland | Nov. 9, 1915 |
| 1,388,324 | Neuland | Apr. 27, 1920 |